United States Patent Office 3,732,160
Patented May 8, 1973

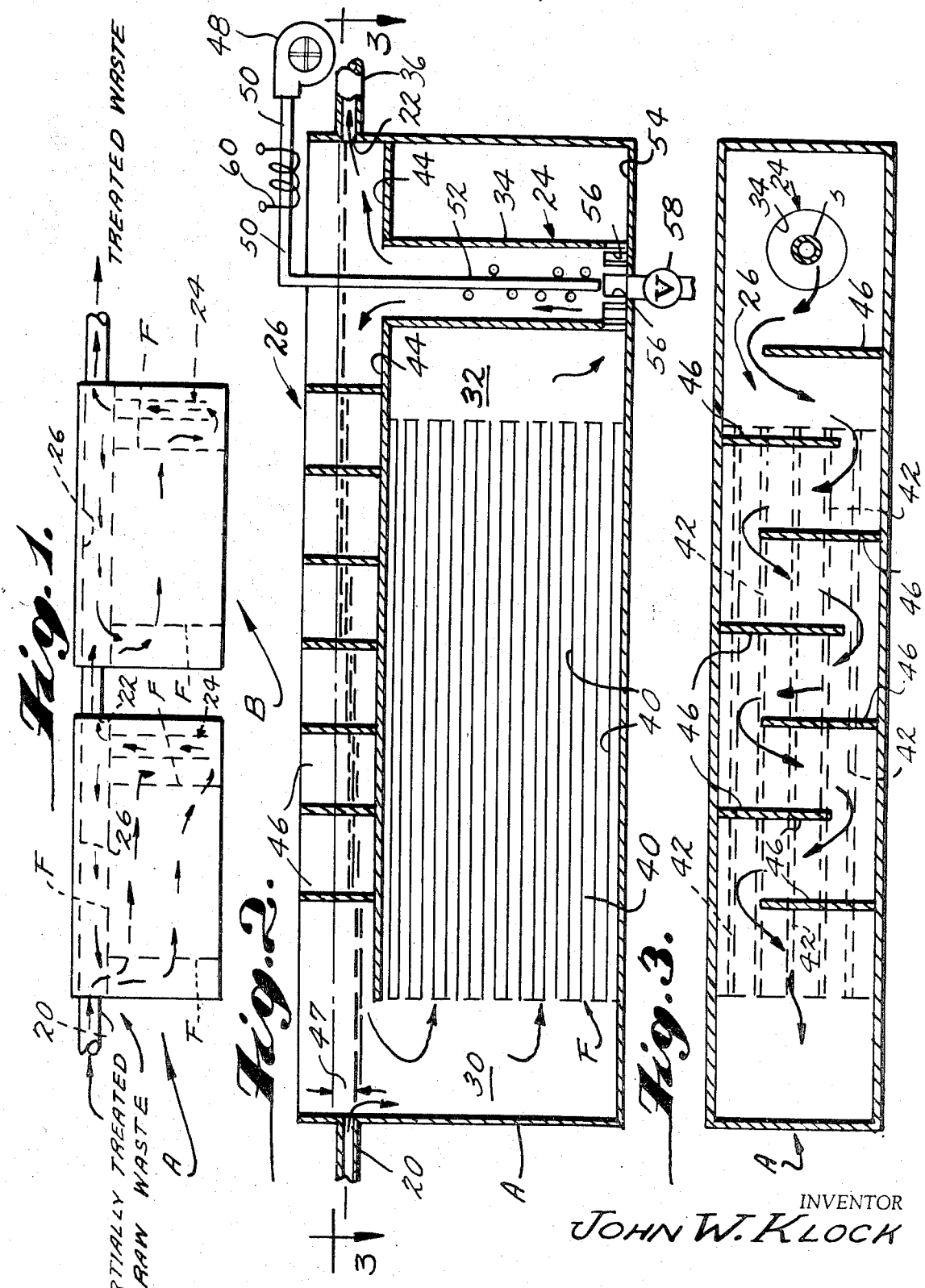

3,732,160
SUBMERGED FILTER-HORIZONTAL FLOW MODE
John W. Klock, Tempe, Ariz., assignor to Research
    Corporation, New York, N.Y.
Continuation-in-part of application Ser. No. 754,341, Aug.
    21, 1968, now Patent No. 3,563,888. This application
    Dec. 31, 1970, Ser. No. 103,271
Int. Cl. C02c 1/04
U.S. Cl. 210—14                                 21 Claims

ABSTRACT OF THE DISCLOSURE

Waste-containing liquor is biochemically treated in a tank or cell by continuously recirculating it through a filter media which is submerged in the liquor while continuously withdrawing a small portion of said liquor. A pressurized column of oxygen-containing gas entrains and lifts the liquid waste through an unobstructed tube and recirculates it horizontally through the filter media. During the lifting process oxygen from the fluid permeates the waste in order to ensure active aerobic metabolism. The tank may be arranged in series with other similar tanks utilizing horizontal flow through the filter media, or one or more of such tanks may be arranged in combination with one or more tanks having vertical flow through the filter media, as disclosed in my copending application, Ser. No. 754,341, filed Aug. 21, 1968. The influent may be either raw sewage or partially treated wastes.

CROSS-REFERENCE TO RELATED APPLICATIONS

This is a continuation-in-part of my application Ser. No. 754,341, filed Aug. 21, 1968, now U.S. Pat. 3,563,888.

BACKGROUND OF THE INVENTION

This invention relates to a method and apparatus for treating waste-containing liquors, for example, raw sewage or partially treated wastes. More specifically, the present invention pertains to a method of aerating liquid containing waste in order to disperse bacterial culture in the waste as it is continuously recirculated through a biochemical filter system.

Filter systems for treating liquid waste have been known for many years. However, the demonstrable inadequacies of these systems are causing increasing concern, particularly in view of the fact that water pollution is rapidly approaching critical proportions, both in the United States and elsewhere in the world. The ever-increasing needs of an exploding population, together with the decreasing supply of unpolluted water, have only been partially offset by rather limited improvements in conventional liquid waste treatment systems.

While the solutions proposed in my copending application, Ser. No. 754,341, filed Aug. 21, 1968, have been found to be highly satisfactory, a primary purpose of this invention is to provide novel improvements in the method and apparatus disclosed in that application. More specifically the present invention is an adaptation of the basic novel concepts of the invention disclosed in my copending application and wherein the flow through and in contact with the submerged filter media is changed from the vertical mode or direction to the horizontal mode or direction. This horizontal flow mode has been found in practice to enhance the internal sedimentation characteristic of the process, thus making the treatment even more stable and capable of improved processing of concentrated industrial wastes, raw sewage and combined raw sewage and solid wastes (garbage), as well as partially treated wastes.

In this horizontal mode of the present invention, the waste is in contact with the culture while moving horizontally through the filter media, thus inducing waste separation by gravitation sedimentation in addition to impact removal. Relatively large open horizontal passages can be employed in the filter media for effective separation when treating wastes of high particulate content, such as raw sewage. An intermediate process would employ the horizontal mode of the present invention with, for example, rock or other spherical or somewhat spherical materials as the filter media, thus obtaining desired relatively high turbulence for processing partially treated wastes to a high degree of clarity.

From certain field experimental work, it became evident that a critical design factor when dealing with concentrated wastes is oxygen transfer. Before commencing, concern was focused on such items as mechanical plugging, etc. The need for oxygen is better understood if the unit is visualized in three parts: (1) oxygen uptake, (2) oxygen utilization, and (3) hydraulic circulation. Previously, in tertiary work, utilizing the invention of my copending application, aforesaid, oxygen transfer was accomplished with the bubbling airlift and a relatively quiet water surface on top. In the horizontal flow mode the recirculating liquor moves horizontally along the top over and out of contact with the filter media. This improves oxygen transfer due to time of interface exposure and turbulence. However, for packing waste this is only marginal and it was found necessary to improve the oxygen transfer portion by increasing turbulence (head loss) in the interface return channel or passageway above the filter media. If too much head loss occurs then the air lift slows down. A series of around-the-end baffles was installed in the return channel at the top of each cell, for improving turbulence, and this was found to be satisfactory.

The novel submerged filter process of the present invention, like the process of my copending application, mentioned above, combines elements of various processes—"activated" bacterial culture, large surface area and filtration which, in a broad sense, is a form of sedimentation. The submerged biological filter in one illustrative embodiment of the present invention comprises a vessel or cell having filter media disposed therein to define a horizontal flow path for the liquor communicating with an air lift pump and a liquor circulation and recirculation path. The vessel is filled with waste to a suitable level above the filter and the air lift pump is started. Waste begins rapidly circulating horizontally through the filter media and to the air lift pump from which it is discharged to flow back across the top of the filter media and then down and horizontally back through the filter media, etc. Some of the liquor will discharge from the cell during the recirculation and flow into another like cell for further processing.

As the waste circulates, particles are separated out through the filter, the larger particles gravitating or settling towards the bottom of the filter media while a dense, flocculant, aerobic bacterial culture develops throughout the filter. The submerged culture is porous and flocculant and does not adhere to the filter media as a thick slime layer which is the case in the conventional trickling filter.

Two or more of such vessels or cells containing the submerged filter of the present invention, in an exemplary embodiment, are placed in series so that each cell adjusts to the waste concentration remaining in the previous unit and carries out additional metabolism, as will be appreciated. The filter media size or passageway therethrough may be larger or coarser in the first cell and finer in each succeeding, downstream cell, in the manner taught in my copending application, mentioned above.

Still referring to the same illustrative embodiment of the invention, the air lift pump rapidly propels the waste through the system. With each cycle, the waste is (1) exposed to the active bacterial culture, (2) the water is reaerated and the dissolved oxygen quickly transferred to the bacterial culture, and (3) gaseous metabolic end products such as $CO_2$ are vented to the atmosphere. During the course of treatment, the waste is advantageously recycled many times (for example, several hundred times) and a large recirculation to throughput ratio in the vessel preferably is provided, as taught in my copending application mentioned above. The recirculation ratio is equal to the quantity of liquor or water circulated through the air lift pump in the vessel per unit time divided by the quantity of liquor or water passing through the treatment process (e.g., passing completely through the vessel) per unit time. This ratio may vary from around 200 to about 1000. This provides a large oxygen supply, vents the medium, and gives the organisms many chances to metabolize the impurities.

If desired, the number of vessels or cells used in the treatment can be varied, depending upon the degree of pollution of the influent (that is, the inflowing liquid waste) and the desired degree of filtration of the effluent. While most of the impurities such as insecticides, detergents, antibiotics, and similar organic molecules are removed in the aerated filters, an activated carbon unit or a vertical flow mode filter tank, of the type disclosed in my copending application aforesaid, may be used in a subsequent procedure, as a polishing step, if that were desired to ensure further and more complete removal of such impurities, and also odor and color.

In addition to the advantages mentioned above, other advantages will become apparent in the more detailed description of the invention which follows, reference being made to the accompanying drawing in which:

FIG. 1 is a schematic view of an exemplary filtering system utilizing the present invention;

FIG. 2 is a vertical cross-sectional view through a submerged filter embodying my invention and schematically illustrating the filter media; and FIG. 3 is a horizontal sectional view taken along line 3—3 of FIG. 2.

DETAILED DESCRIPTION OF THE INVENTION

Referring to the drawings, which show illustrative embodiments of the invention, FIG. 1 shows a schematic representation of tanks or compartments A and B arranged in series. Filter media F is provided therein as indicated, and flow therethrough will be in the horizontal direction.

These tanks or vessels A and B are of similar construction and may be of any suitable configuration. In the process of the invention, biochemical reactions occur in these vessels. For this purpose an active bacterial culture is suspended within the voids of the filter medium. The filter medium may comprise rock, gravel or sand, or parallel and spaced horizontally extending plates or parallel spaced horizontally extending arcuate sections of a thermoplastic material, corrugated fiberglass, or any suitable material. Waste is aerobically metabolized within the containers, and additionally, the system is designed to effectively vent metabolically derived gases, such as carbon dioxide ($CO_2$) to the atmosphere. Any nitrogen present in the impurities will be oxidized under the prevailing aerobic conditions to nitrate, which is soluble.

The specific size and grading of the filter media in the respective vessels may be varied in accordance with the needs of a particular system, as will be evident, and the filter media may be progressively finer, in going from tank to tank, as disclosed in my copending application.

The number of filtration steps in the present inventive system can, of course, be altered, depending upon the degree of pollution of the influent and the desired composition of the effluent. For example, tanks A and B may be used to directly treat raw sewage or to treat and thus upgrade the effluent from a conventional activated sludge or trickling filter system (not shown). In the former case, more than two tanks or cells A and B may be used in series.

As shown in FIGS. 1 and 2, each tank A and B is of similar or identical construction including inlet 20, outlet 22, filter media F, air lift pump 24, and return or recirculation passageway 26 above the filter media F. An inlet chamber 30 is formed in the tank at one end of the filter media F and an outlet chamber 32 at the other end. An air lift means is provided in tubular passageway 34 which opens at its upper end to return or recirculation passageway 26 and also to the outlet 22. When connecting the cells in series, a suitable conduit means 36 is provided connecting the outlet of one tank or cell to the inlet of the next downstream tank or cell, as will be evident.

The tank A shown in FIGS. 2 and 3 is of rectangular vertical and horizontal sectional configuration, having a greater length than height. For the more concentrated wastes, a larger length to height ratio is preferable to increase the surface length of passageway 26 thus increasing aeration time and reducing oxygen transfer time in the filter media F. Gaseous metabolic end products such as $CO_2$ are released from the surface of the liquor passing through passageway 26 and are released to the ambient air.

In the exemplary embodiment shown in FIGS. 2 and 3, the filter media F is shown as including a plurality of vertically and horizontally spaced plates 40, the horizontal spacing defining openings 42 as seen in FIG. 3. A solid plate 44 covers the top of the filter media and a plurality of baffles 46 is provided in the passageway 26, as indicated. These baffles will promote turbulence which, in some installations, is believed to be important to improve oxygen transfer during flow through the return passageway 26. Passageway 26 is shown in FIG. 2 as being stepped, or of a decreasing cross-sectional area in the direction from right to left, as viewed in FIG. 2, and is open at its top to the atmosphere.

The plates 40 may be made of any suitable material, such as vertically spaced horizontally extending arcuate sections of thermoplastic material placed in a horizontal direction with respect to the direction of flow of the liquor and arranged so as to present the maximum surface area. The air lift means is shown as including a compressor or pump 48 and a discharge conduit 50, 52, the section 52 extending concentrically within conduit 34 and terminating in an outlet disposed above the bottom wall 54 of the tank A. Conduit 34 may be mounted to rest on the bottom wall 54, as shown in FIG. 2, and having openings 56 therein for the introduction of liquor thereinto. A suitable drain valve 58, normally closed is shown disposed below the conduit 34. The upper end of conduit 34 is shown connected to plate 44 and opening to passageway 26 and outlet 22.

Air or other suitable oxygen-containing gas is pumped through conduits 50, 52 and will rise as bubbles in conduit 34, in the space between the conduits 34 and 52, to provide a lift pump action, in the manner disclosed in my copending application. If desired, suitable heating means, shown schematically in FIG. 2 as a heating coil 60, may be provided to pre-heat the gas flowing through conduits 50, 52.

While the filter media has been shown in FIGS. 2 and 3 in the form of plates 40, it will be appreciated that rock or other spherical or roughly spherical media may be used. A plurality of tank A, such as two or three may be arranged in series, so that horizontal flow through the filtering media occurs in each tank or cell, or such as combination of cells in series may be utilized with a submerged filter of the vertical flow mode type, as disclosed in my copending application, arranged in series at the end. It should also be evident that various submerged filter units of the types referred to, may be arranged in parallel, or series-parallel, as well as in series. Also, recycling of waste water to upstream units may be provided for, if desired. Such modifications, as well as others, would be obvious to one skilled in the art and are within the scope of the invention.

In the horizontal flow mode tanks or cells of the present invention, it will be seen that the waste-containing liquor to be treated is introduced to the first tank through inlet 20. A sufficient quantity of waste is introduced to completely submerge the filter F. The pump 48 will discharge the oxygen-containing gas into conduit 34 whereby the liquor will be drawn horizontally through the filter F then up through the conduit 34 after which some of the liquor will recirculate through passageway 26 (and back through filter F) while some of the liquor will discharge through outlet 22. Thus, a continuous circulation and recirculation of liquor within the tank or cell will be effected.

The column of oxygen-containing gas which emanates from the outlet of conduit 52 does not merely entrain and lift the liquid waste upwardly. First, it lifts at a rate which ensures a rapid circulation and hence a high metabolic rate. Secondly, as it lifts the liquid waste through the 34, the oxygen in the air permeates the liquid waste which is entrained in the air column, thus transferring a sufficient quantity of oxygen to the waste to "re-trigger" or "re-invigorate" the process of aerobic metabolism. Oxygen is rapidly exhausted during aerobic metabolism. Hence oxygen must be continually supplied in order to ensure that the waste is effectively metabolized.

As in the case of the vertical flow mode submerged filters of my copending application, it is important that a large recirculation to throughput ratio of the liquor be effected in the submerged biological operation of the present invention This recirculation ratio is defined as being equal to the quantity of liquor circulated through the fluid lift passageway in pipe 34 per unit time divided by the quantity of liquor passing through the treatment process (through outlet 22) per unit time. This ratio may be varied, for example, by varying the input flow rate of liquor into the vessel. An illustrative range for this ratio is between about 200 and 1000 to 1. This provides a substantial improvement over conventional systems wherein the recirculation ratio is in the range of between about 1 and 5 to 1.

Since the filter media are submerged and hence not directly exposed to the atmosphere, the bacterial culture is highly porous and flocculant, and circulation is not retarded, as is the case in a trickling filter system. In the embodiment shown in FIG. 1, since waste metabolism is high in the first tank A, much smaller quantities of waste remain and less bacterial production occurs in the downstream tanks, thus allowing the use of finer filtering media in those downstream tanks. System design and filter characteristics are thereby improved by exposing waste to more bacteria in less space than is possible in conventional systems. Thus, the recirculation ratio may be less in the downstream vessel(s), and this is satisfactory inasmuch as the liquor has already been initially treated in vessel A before coming to vessel B, and therefore a smaller recirculation ratio suffices in the downstream vessel.

Furthermore, since the waste is in contact with the culture while moving horizontally through the filter media F in each tank, waste separation by gravitational sedimentation is induced and advantageously occurs in addition to impact removal.

With reference to the embodiment of FIGS. 2 and 3, the baffles 46 further improve oxygen transfer due to the time of interface exposure to oxygen and turbulence. With the increase in turbulence produced by baffles 46 a concomitant increase in hydraulic head loss 47 was also observed in an experimental unit in the interface channel or passageway 26. Hydraulic head loss shown in FIG. 2 is greatly exaggerated for illustrative purposes, for it is realized that if an excessive amount of hydraulic head loss is experienced, the efficiency of the air lift pump slows down. A hydraulic head loss of the order of about one inch has been found to be acceptable. For some applications the increased turbulence produced by baffles 46 will not be necessary and accordingly they would be omitted.

It will be noted that by submerging the filter completely beneath the surface of the waste-containing liquor, and appropraitely positioning the air lift piping or tubing, it is possible to efficiently maintain continuous recirculation within the system. Since the upper end of conduit 34 remains below the surface of the liquor at all times, it is not necessary to lift the liquor above the liquid surface. Hence circulation power requirements are desirably very low.

As mentioned previously, the present invention may be employed either to upgrade the effluent from a conventional system, to process concentrated waste liquids, or to treat primary waste (raw sewage) as such.

EXAMPLE 1

A field experimental unit was installed utilizing three cells of the present invention in series (with horizontal flow through the filter in each cell). The effluent from a packing plant was being treated. Results from running the unit continuously for four months have been far beyond expectations and indicate the suitability of the present invention for concentrated waste treatment. Below is a summary of the results for that four month period:

Volume of waste treated per day: 150 gal./day
Detention time: 48 hours
Number of analytical observations:
    Influent waste: 16
    Effluent waste: 10
BOD (5 day, 20° C.): Influent waste—average of 1424 mg. $O_2$/liter (607–4126 range)
Effluent waste—average of 138 mg. $O_2$/liter (97–162 range)
Percent reduction=90.3%

In comparison to a conventional activated sludge plant, this unit is handling about three times the organic loading. Loading intensities are used to compare the two systems using grams BOD/ft.$^3$-day. This is believed to be a realistic measurement.

| System | Loading intensity (grams BOD/ft.$^3$-day) |
|---|---|
| 1. Activated sludge | (a) Aeration unit only — 12.4<br>(b) Complete unit (aerator plus secondary sedimentation basin). — 8.6 |
| 2. Submerged filter of this invention. | 20.2 |

If the digester, thickeners, etc. were included in the activated sludge system, the loading intenstiy would diminish further.

EXAMPLE 2

In another experimental unit, two cells utilizing the horizontal flow mode of the present invention were arranged in series for the tertiary treatment of conventionally treated sewage (activated sludge) having a 5-day, 20° C. BOD of approximately 23 mg. $O_2$/liter. The following table in which measurements were taken over a four month period indicates the operation and results:

| | Q (gal./day) | Detention time (hrs.) | Turbidity (p.p.m.) | Effluent BOD 5-day, 20° C. (mg. $O_2$/liter) |
|---|---|---|---|---|
| Run: | | | | |
| 1 | 672 | 8.2 | 1.3 | 5.38 |
| 2 | | | | 2.95 |
| 3 | 878 | 6.1 | 3.2 | 5.92 |
| 4 | 1,030 | 5.2 | 2.7 | |
| 5 | 950 | 5.65 | 2.2 | 2.87 |
| 6 | 675 | 7.95 | 2.0 | 2.66 |
| 7 | 675 | 7.95 | 3.15 | 12.1 |
| 8 | 675 | 7.95 | 2.0 | 4.1 |
| 9 | 652 | 8.23 | 2.45 | 4.56 |
| 10 | | 7.95 | 3.55 | 2.70 |
| Average | 776 | 7.24 | 2.51 | 4.73 |

EXAMPLE 3

A three cell series arranged horizontal flow filter unit according to the invention, as described in Example 1, was observed for a period of 7 months. Each unit contained plastic media comprising half-cylinder plates 6 inches wide and 5.5 inches long. The plates were packed within the cell at the rate of 44 plates per cubic foot, producing an equivalent horizontal surface area of 10 square feet per each cubic foot of media. A summary of the results obtained measuring BOD reduction is as follows:

|  | BOD (mg./l., 5-day, 20° C.) | | | |
|---|---|---|---|---|
|  | Influent | Unit I | Unit II | Unit III (effluent) |
| Run: | | | | |
| 1 | 662 | | | |
| 2 | 2,015 | | | |
| 3 | 988 | | | 163 |
| 4 | 674 | | | 162 |
| 5 | 638 | | | 152 |
| 6 | 910 | | | 129 |
| 7 | 1,133 | | | 97 |
| 8 | 1,066 | | | 132 |
| 9 | 2,188 | | | 154 |
| 10 | 1,178 | 775 | 324 | |
| 11 | 1,416 | 535 | 221 | 142 |
| 12 | 1,268 | 443 | 251 | 146 |
| 13 | | 255 | 190 | 180 |
| 14 | 958 | 161 | | 55 |
| 15 | 1,607 | 369 | 110 | 69 |
| 16 | 1,280 | | 90 | 53 |
| 17 | 723 | 243 | | 52 |
| Average | 1,260 | 480 | 266 | 120 |
| Percent reduction | 0 | 62 | 79 | { 187 / 90.5 / 85 } All data. |

It will thus be seen that the present invention retains the principal virtues and advantages of the filtering process and apparatus disclosed in my copending application, referred to above, and adds thereto advantages, such as those noted above. The disclosure of that copending application, therefore, is incorporated herein by reference.

The size of the filtering media used may be varied, as desired, and it is not essential that it be graded in size from one vessel to the next. The same gravel, in fact, may be used as the filtering media for all vessels, if desired. The gravel particle size is selected to provide suitable passageways of relatively appreciable dimensions between particles. Experience has shown that a minimum stone size for water polishing purposes should be not less than about ¾ inch in diameter for large horizontal units. Mixed size media should not be used in the same unit except when using a series of units, each unit containing a media of equal or smaller size than the preceding unit, as described below. It has also been found that fine sand gives excellent chemical results but is not preferred due to its inadequate void space capacity.

If desired, a coarser or larger particle size could be used for the lower part of the filter media F in the tank or cell with a finer particle size thereabove. This would help to reduce hydraulic resistance and to keep the bottom scoured clean.

Although the method and apparatus of the invention have been described with reference to particular embodiments, it will become apparent to those skilled in the art that variations can be made in the inventive system. All such variations, therefore, as would be obvious to those skilled in the art are intended to be included within the scope of this invention.

What is claimed is:

1. A method of treating waste-containing liquor comprising the steps of:
   providing a first vessel with a filtering medium therein having horizontally spaced entrance and discharge portions, said entrance portion located at one end of said filtering medium providing inlet for the introduction of liquor into the filtering medium and said discharge portion located at the opposite end of said filtering medium providing outlet for the discharge of liquor from said filtering medium, and a separate open fluid passageway in communication with said medium through said outlet portion,
   introducing a waste-containing liquor into said vessel,
   introducing an oxygen-containing gas into said passageway to provide a pumping action in said passageway whereby said gas and said liquor flow together in a single direction through said passageway,
   continuously conducting substantially all of said liquor from said entrance portion to said discharge portion along an essentially horizontal path through said filtering medium,
   continuously circulating said liquor within said vessel and horizontally through said filtering medium and then through said passageway by means of said pumping action, and
   continuously withdrawing from said vessel a portion of said circulating liquor.

2. A method as defined in claim 1 wherein the ratio of the flow rates of liquor flowing in said passageway and withdrawn from said vessel is between about 200 and 1000.

3. A method as defined in claim 1 wherein the filtering medium is submerged in the circulating liquor, and continuously venting gases from the passageway and the vessel.

4. A method as defined in claim 2 wherein the waste-containing liquor contains organic nitrogen compounds, organic sulfides and organic carbon, and wherein the oxygen containing gas oxidizes the organic nitrogen compounds, the organic sulfides and the organic carbon to nitrates, sulfates, and carbon dioxide respectively.

5. A method as defined in claim 4 wherein the oxygen-containing gas is heated prior to admission into said passageway, and wherein said filtering medium comprises a biochemical including a mixture of sand and gravel.

6. A method as defined in claim 1 and further comprising:
   continuously introducing said liquor withdrawn from said first vessel into a second vessel having a filtering medium therein and a separate open fluid passageway in communication with said medium, performing the steps recited in claim 1 in said second vessel, and wherein the ratio of the flow rates of liquor flowing in the passageway of the first vessel and withdrawn from the first vessel is greater than the corresponding ratio in said second vessel.

7. A method as defined in claim 1 and further comprising:
   providing for turbulence in said circulating liquor as it flows through said passageway.

8. Apparatus for treating waste-containing liquor comprising:
   a vessel,
   means for introducing said liquor into said vessel,
   a filtering medium in said vessel,
   means defining an open fluid passageway adjacent to said medium,
   pumping means operatively associated with said passageway defining means to provide a flow of oxygen-containing gas through said passageway,
   said passageway having inlet means and outlet means spaced from each other within said vessel to provide with said filtering medium a path within said vessel for the continuous circulation and recirculation of liquor in said vessel wherein said liquor passes horizontally through said filtering medium and then through said passageway,
   said passageway being arranged so as to have flow of liquor therethrough in a single direction, and
   second outlet means operatively connected to said path for withdrawal from said vessel of some of the liquor circulating in said path, and further including horizontally spaced entrance and discharge portions adjacent to said filtering medium, said entrance portion located at one end of said filtering medium providing an inlet for the introduction of liquor into the filtering medium and said discharge portion located at the opposite end of said filtering medium providing an outlet for the discharge of liquor from said filtering medium, said entrance and discharge portions positioned to direct the path of substantially all said circulating liquor from said entrance portion to said discharge portion along an essentially horizontal path through said filtering medium.

9. Apparatus as defined in claim 8 including means providing a ratio of between about 200 and 1000 between the flow rates of liquor flowing in said passageway and withdrawn from said vessel.

10. Apparatus as defined in claim 8 wherein said vessel is open to the atmosphere above said outlet means of said passageway.

11. Apparatus as defined in claim 9 wherein said second outlet means is arranged adjacent to said passageway outlet means.

12. Apparatus as defined in claim 10 wherein a portion of said passageway is vertical and is arranged adjacent to said filtering medium with said inlet means of said passageway being disposed adjacent the bottom of said vessel and said first outlet means being spaced from the vertical portion of said passageway by the length of said filtering medium and disposed adjacent the upper part of said filtering medium, and further wherein another portion of said passageway is horizontal and extends from said vertical portion of said passageway to said first outlet means, said horizontal portion being disposed above said filtering medium and separated therefrom by a wall thereby providing for flow of liquor from said vertical portion of said passageway to said first outlet means.

13. Apparatus as defined in claim 8 and further including:
a second vessel connected to said first vessel by said second outlet means whereby liquor withdrawn from said first vessel will flow into said second vessel,
a filtering medium in said second vessel, and
means in said second vessel including pumping means introducing an oxygen-containing gas into said second vessel for continuously circulating the liquor within said second vessel and through said second filtering medium, and
means for continuously withdrawing from said second vessel a portion of the liquor circulating therein.

14. Apparatus as defined in claim 13 wherein the filtering media in said vessels is particulate and coarser in said first vessel than in said second vessel, and wherein the ratio of the flow rates of liquor flowing in said passageway in the first vessel and withdrawn from said first vessel is greater than the corresponding ratio in said second vessel.

15. Apparatus as defined in claim 8 and further including:
a second vessel connected to said first vessel by said second outlet means whereby liquor withdrawn from said first vessel will flow into said second vessel, a filtering medium in said vessel, and
means in said second vessel including pumping means introducing an oxygen-containing gas into said vessel for continuously circulating and recirculating the liquor horizontally through said filtering medium and then through said passageway, and
means for continuously withdrawing from said second vessel a portion of the liquor circulating therein.

16. Apparatus for treating waste-containing liquor comprising:
a vessel,
means for introducing said liquor into said vessel,
a filtering medium in said vessel,
horizontally spaced entrance and discharge portions adjacent to said filter medium, said entrance portion located at one end of said filtering medium providing the sole inlet for the introduction of liquor into the filtering medium and said discharge portion located at the opposite end of said filtering medium providing the sole outlet for the discharge of liquor from said filtering medium,
means defining an open fluid passageway adjacent to said medium, pumping means operatively associated with said passageway defining means to provide a flow of oxygen-containing gas through said passageway,
said passageway having inlet and outlet means spaced from each other within said vessel to provide with said filtering medium a path within said vessel for the continuous circulation and recirculation of liquor horizontally through said filtering medium and then through said passageway, said passageway having means separate from said pumping action causing turbulence in said circulating liquor.

17. Apparatus as defined in claim 16 wherein at least a portion of said passageway is horizontal.

18. Apparatus as defined in claim 17 wherein said horizontal portion of the passageway is disposed above said filtering medium.

19. Apparatus as defined in claim 18 wherein said means to create turbulence is disposed in said horizontal portion of said passageway.

20. Apparatus as defined in claim 19 wherein said means to create turbulence comprises a plurality of baffles disposed in said horizontal passageway portion and spaced from each other in the direction of flow through said horizontal passageway portion.

21. Apparatus as defined in claim 8 wherein
said vessel is open to the atmosphere above said outlet means of said passageway, and
a portion of said passageway is vertical and is arranged adjacent to said filtering medium with said inlet means being disposed adjacent the bottom of said vessel and said first outlet means being disposed adjacent the upper part of said filtering medium, and wherein another portion of said passageway is horizontal and is disposed above said filtering medium.

References Cited

UNITED STATES PATENTS

| 3,402,125 | 9/1968 | Tanaka | 210—17 X |
|---|---|---|---|
| 3,468,795 | 9/1969 | Bye-Jorgensen et al. | 210—17 X |
| 3,563,888 | 2/1971 | Klock | 210—17 |

FOREIGN PATENTS

| 610,751 | 10/1948 | Great Britain. |
|---|---|---|
| 528,793 | of 1931 | Germany. |

MICHAEL ROGERS, Primary Examiner

U.S. Cl. X.R.

210—17, 150, 196